United States Patent [19]

Ort

[11] 3,925,338
[45] Dec. 9, 1975

[54] CONTROL OF POLYMER PARTICLE SIZE IN OLEFIN POLYMERIZATION

[75] Inventor: Morris R. Ort, Seabrook, Tex.

[73] Assignee: Monsanto Company, St. Louis, Mo.

[22] Filed: Mar. 16, 1973

[21] Appl. No.: 341,837

[52] U.S. Cl. ............... 260/88.2 R; 260/94.9 B; 260/94.9 DA; 260/94.9 E; 260/94.9 P
[51] Int. Cl.$^2$ ............... C08F 2/34; C08F 10/02; C08F 110/02; C08F 210/16
[58] Field of Search... 260/94.9 P, 94.9 DA, 94.9 E, 260/94.9 B, 88.2 R

[56] References Cited
UNITED STATES PATENTS

| | | | |
|---|---|---|---|
| 3,547,829 | 12/1970 | Lamborn | 260/94.9 B |
| 3,580,898 | 5/1971 | Rosen et al. | 260/94.9 B |
| 3,624,063 | 11/1971 | Witt | 260/94.9 P |
| 3,694,421 | 9/1972 | Vetter | 260/88.2 R |
| 3,701,766 | 10/1972 | Delbouille et al. | 260/94.9 DA |
| 3,772,261 | 11/1973 | Faltings et al. | 260/94.9 DA |
| 3,784,539 | 1/1974 | Ort | 260/85.3 R |

FOREIGN PATENTS OR APPLICATIONS

| | | | |
|---|---|---|---|
| 2,163,272 | 7/1972 | Germany | 260/94.9 DA |
| 1,202,176 | 8/1970 | United Kingdom | 260/94.9 B |
| 1,110,566 | 4/1968 | United Kingdom | 260/94.9 P |

*Primary Examiner*—Alan Holler
*Attorney, Agent, or Firm*—Elizabeth F. Sporar

[57] ABSTRACT

Control of particle size of olefin polymers produced by gas-phase polymerization of at least one olefin using Ziegler-type catalysts deposited on solid supports in a fluidized-solids operation is effected by controlling the particle size of the catalyst support.

11 Claims, No Drawings

CONTROL OF POLYMER PARTICLE SIZE IN OLEFIN POLYMERIZATION

BACKGROUND OF THE INVENTION

The present invention relates to the polymerization of olefins in the gas-phase at low pressures using Ziegler-type catalysts. More particularly, it relates to a method of controlling particle size of the polymers produced in such polymerizations.

It has been well known for some time now that ethylene and other olefins can be polymerized alone to produce homopolymers or in combination to produce interpolymers or copolymers at relatively low pressures using so-called Ziegler catalysts. Ziegler catalysts may be described broadly as consisting of various combinations of strong reducing agents such as organometallic compounds of an alkali metal, alkaline earth metal, zinc, earth metal or a rare earth metal and various reducible heavy metal compounds such as the halides, alkoxides, acetylacetonates, etc., of the metals of Groups IV-B, V-B, VI-B, VII-B and VIII of the periodic system. Among the more active types of catalyst for this reaction are those consisting of a vanadium halide or oxyhalide and an organoaluminum compound such as an aluminum alkyl, an alkylaluminum hydride, an alkylaluminum halide, an alkyl-aluminum alkoxide and the like or mixtures thereof as an activator.

The polymerization can be conducted in the liquid or slurry phase, i.e., the catalyst is suspended in an inert liquid solvent which serves as a reaction medium, or it can be carried out in the gaseous or vapor phase. In gas-phase processes, the catalytic components are deposited upon finely divided solids which are employed in a dense bed of fluidized solids kept in a state of turbulent motion by mechanical agitation or by passage of the gaseous monomer or monomers, containing diluent gases if desired, through the bed. This latter method is more advantageous from the standpoint of economics as well as ease and efficiency of operation. The elimination of handling, separation, recovery and regeneration of a solvent with its attendant necessity for polymer clean-up and drying provides not only lower capital and operating costs but makes for easier control and reduced maintenance in the gas-phase technique.

However, in the fluidized-solids, gas-phase process certain difficulties arise due to the growth of the polymer particles as the reaction proceeds. The irregular growth of individual particles and the agglomeration of a plurality of small particles to larger agglomerates result in a particle size distribution which prevents a uniform agitation of the material to be fluidized. If the product particles are large (a high percentage over 14 mesh), fluidization slows down and particles may even become stagnant in certain regions. When this happens, hot spots are formed which cause several particles to stick together and form lumps. As a consequence, the equipment becomes clogged and the temperature rise continues, adversely affecting the catalyst and ultimately causing breakdown of the process. On the other hand, if the product particles are fine (a high percentage over 100 mesh), a large amount of the particles are carried out of the bed necessitating the use of a separator to remove them from the cycle gas system for return to the catalyst bed. Accordingly, there is an obvious need for controlling the particle size of the product in the gas-phase polymerization of olefins at low pressures. It is an object of the present invention to provide a method for effecting such control.

SUMMARY OF THE INVENTION

While the particle size of the olefin polymerization product from the gas-phase polymerization process using Ziegler-type catalysts is known to vary with the molecular weight of the product and to some extent is also known to be influenced by the molecular weight distribution of the product, it has now been discovered that the product particle size can be controlled regardless of the molecular weight of the product made. Such control is accomplished by using a catalyst support material or substrate having a particular range of particle size. A catalyst support material of large particle size will produce large polymer particles whereas a catalyst support material of small particle size will result in a polymer product of small particle size. Accordingly, the process of the invention is one for the polymerization of olefins in the gas phase using a Ziegler-type catalyst deposited on a solid support in a fluidized bed operation which comprises controlling the polymer product particle size by determining the average particle size of the polymer produced and decreasing the average particle size of the catalyst support if the average particle size of the polymer product is too large and increasing the average particle size of the catalyst support if the average particle size of the polymer product is too small and thereby obtaining a polymer having the desired average particle size for satisfactory fluidization. Generally, for efficient operation, the catalyst substrate or support will have an average particle size in the range from about 30 to about 600 $\mu$ depending upon the melt index of the polymer being produced. The higher melt index polymer (~5 and up) requires a support or substrate having a larger average particle size while the lower melt index product (~1 and lower) requires a smaller particle size. By employing a support having the proper particle size, trouble-free operation of the fluidized bed of catalyst and polymer is assured.

DESCRIPTION OF THE PREFERRED EMBODIMENTS

The invention is illustrated in the following examples which are not to be construed as limiting it in any manner whatsoever.

EXAMPLE 1

Three supported catalysts for the polymerization of ethylene in the gas phase were prepared by depositing the catalyst components on polyethylene substrates having three different particle sizes. The polyethylene substrates were polymers which had been prepared in previous gas-phase polymerizations of ethylene, ground and sieved using U.S. Standard Screen Series to include all particles passing through 30-mesh, 40-mesh and 60-mesh sieves, respectively. About 600 cc of the polyethylene powder was charged to a catalyst preparation vessel and purged with dry nitrogen at 50° C for about 1 hour. Approximately 30 mmoles of ethylaluminum sesquiethoxide (EASE) was deposited on the polyethylene maintained in a fluidized state by means of a stream of inert gas by the dropwise addition of a solution of this alkoxide in hexane. Thereafter, the hexane was evaporated and 5 mmoles of $VOCl_3$ was reacted with the EASE by passing vapors of this compound into the fluidized bed of treated polyethylene. The polyethylene containing the EASE-$VOCl_3$ catalyst complex supported thereon was transferred to a catalyst storage vessel.

Another quantity of polyethylene powder (500 cc) was purged with dry nitrogen at 50°C for about 1 hour. While the polyethylene was maintained in a fluidized state, a sufficient amount of a 50% solution of isoprenyl aluminum (IPA) in hexane was added dropwise to it to effect deposition of 50 mmoles of the alkylaluminum compound on the polyethylene particles. The hexane carrier was evaporated and the treated polyethylene was transferred to a storage vessel.

The catalyst components prepared as described above were used in the polymerization of ethylene employing a bench-scale unit comprising a polymerization reactor, a heat exchanger and the necessary accessory equipment. The jacketed reactor was generally of cylindrical configuration and of such size as to contain a fluidized bed of catalyst particles approximately 4 in. in diameter and 2.5 – 3 ft. in depth. At the top of the catalyst bed section, the reactor expanded in the form of an inverted cone into a disengaging section of larger diameter where any entrained particles in the unreacted gas were separated and fell back down into the bed. Recycle gas was continuously introduced at the bottom of the reactor at a rate sufficient to maintain the particles in the bed in a highly agitated state so as to create a dense phase therein. Make-up ethylene and hydrogen were introduced into the recycle gas line while fresh catalyst particles were fed into the reactor from the top. The polymer product was withdrawn from near the bottom of the reactor. Unreacted gas, that is, recycle gas, from the top of the disengaging zone was led through a heat exchanger to maintain a predetermined temperature before being returned to the catalyst bed.

The particles of catalyst complex supported on polyethylene and isoprenyl aluminum supported on polyethylene were charged semicontinuously to the reactor in equal volumes (usually 30 cc of each component) while the reactor was maintained at a pressure of 500 psig. Ethylene was fed continuously into the fluidized bed together with sufficient hydrogen to maintain a hydrogen concentration of 6 ± 2% in the reactor. Product polyethylene was continuously withdrawn at a rate of ~1 pph as described above. Reaction temperature in the catalyst bed was maintained at approximately 90° – 95°C. The melt index of the products recovered was 1.0 ± 0.2. Melt index ($I_2$) was determined by ASTM Test D-1238-65T using a 2160-gram weight. The polyethylene products obtained with each of the catalysts employed were subjected to sieve analysis using the U.S. Standard Screen Series for determination of particle size distribution. Results are presented in Table 1 below. Average particle size of the polymers was determined by plotting on probability paper for each sieve except the largest, the log of the particle size of the material retained on that sieve against the cumulative weight. Probability paper was employed for plotting since this method gave straight-line plots. A straight line was drawn through the points and the average particle size was read at 50% probability. It will be seen from the data in the table that the percentage of large-sized particles (> 14 mesh) in the polymer product is considerably reduced when a catalyst support or a substrate of smaller particle size is employed.

TABLE I

| Catalyst | 1 | | 2 | | 3 | |
|---|---|---|---|---|---|---|
| Catalyst Support Particle Size | <30 mesh (<590µ) | | <40 mesh (<420µ) | | <60 mesh (<250µ) | |
| Polymer Particle Size | | | | | | |
| | | | Wt. % Retained | | | |
| Mesh Size | Opening in Microns | Sieve | Cum* | Sieve | Cum* | Sieve | Cum* |
| 14 | 1400 | 30.0 | 30.0 | 8.6 | 8.6 | 0.7 | 0.7 |
| 30 | 590 | 51.7 | 81.7 | 47.3 | 55.9 | 44.7 | 45.4 |
| 40 | 420 | 11.4 | 93.1 | 19.6 | 75.5 | 35.5 | 80.9 |
| 60 | 250 | 5.4 | 98.5 | 16.4 | 91.9 | 15.2 | 96.1 |
| 80 | 175 | 1.3 | 99.8 | 5.6 | 97.5 | 2.9 | 99.0 |
| 100 | 150 | 0.0 | 99.8 | 1.3 | 98.8 | 0.5 | 99.5 |
| Pan | | 0.1 | 99.9 | 1.2 | 100.0 | 0.5 | 100.0 |
| Average Particle Size, µ | | 1600 | | 1000 | | 950 | |

*Cumulative

EXAMPLE 2

Catalysts were prepared in the manner described in Example 1 employing similar polyethylene substrates having different particle sizes. On the substrate of Catalyst 1 there was deposited 30 mmole of EASE, 5 mmoles of $VOCl_3$ and 100 mmoles of IPA and on the substrate of Catalyst 2, there was deposited 30 mmoles of ethylaluminum diethoxide (EADE), 5 mmoles of $VOCl_3$ and 100 mmoles of IPA. Polymerizations of ethylene using these catalysts were conducted following the procedure used in Example 1 employing 10–13% hydrogen and a temperature of 98° – 102°C with Catalyst 1 and 5.3–5.9% hydrogen and a temperature of 106.5° to 109°C with Catalyst 2. The polymer made with Catalyst 1 had a melt index ($I_2$) of 20.0 while that produced with Catalyst 2 had a melt index ($I_2$) of 19.2. Particle size distribution of each of the polymer products was determined as described in Example 1. From the results which are presented in Table 2, it will be seen again that particle size of the polymer product varies with the particle size of the catalyst support, the polymer produced with a catalyst substrate containing fewer particles of a size > 14 mesh, i.e., Catalyst 2, exhibiting a significantly smaller percentage of particles in this larger size range.

EXAMPLE 3

A quantity of silica gel (MS ID Grade 952 available from Davison Chemical Division, W. R. Grace and Company, Industrial Chemicals Dept., Baltimore, Maryland) having an average particle size of approximately 50 – 65µ (230 to 270 mesh size U.S. Standard Series) was dehydrated in a fluid bed at 200°C using dry nitrogen as the fluidizing gas for at least 12 hours. Approximately 20 g of the dehydrated gel was charged to a small fluid-bed catalyst preparation unit and fluidized with dry oxygen-free nitrogen at about 50°C while a 2M solution of triethylaluminum (TEA) in hexane was added dropwise onto the silica. The amount of TEA used was equivalent to 0.8 to 1.0 millimole per gram of silica gel. After the TEA addition was complete, the hexane was evaporated from the fluid bed.

gen was employed for molecular weight control giving a polymer product with a melt index of 21.1 and a density of 0.9700. Particle size distribution in the polymer products was determined as in the previous examples and the results are presented in Table 3 below. From these results, it is very easily seen that the average particle size of the polymers made using a silica gel sub-

TABLE 2

| Catalyst | | 1 | | 2 | |
|---|---|---|---|---|---|
| Catalyst Support Particle Size, | | <20 mesh (<840μ) | | <40 mesh (<420μ) | |

Polymer Particle Size

| Mesh Size | Opening in Microns | Sieve | Wt. % Retained Cum | Sieve | Cum |
|---|---|---|---|---|---|
| 14 | 1400 | 12.2 | 12.2 | 0.9 | 0.9 |
| 30 | 590 | 44.5 | 56.7 | 54.4 | 55.3 |
| 40 | 420 | 15.7 | 72.4 | 24.1 | 79.4 |
| 60 | 250 | 14.7 | 87.1 | 13.7 | 93.1 |
| 80 | 175 | 6.1 | 93.2 | 3.6 | 96.7 |
| 100 | 150 | 3.2 | 96.4 | 1.7 | 98.4 |
| Pan | | 3.6 | 100.0 | 1.6 | 100.0 |
| Average Particle Size, μ | | 1100 | | 1050 | |

To a stirred, nitrogen-blanketed glass vessel there was charged 75 ml of hexane, 2 mmoles of pure $VOCl_3$, 12 mmoles of EADE as a 2M solution in hexane and 8 mmoles of triethylaluminum as a 2M solution in hexane. The mixture was stirred for 10 minutes after which it was fed dropwise into the catalyst preparation unit onto the TEA-silica gel reaction product to become deposited thereon. After evaporation of all the hexane from the fluid-bed unit, the prepared catalyst was diluted with 600 cc of polyethylene powder made in a previous gas-phase polymerization which had been purged with dry nitrogen.

The catalyst prepared as described just above was used for the polymerization of ethylene in two separate runs following substantially the procedure described in Example 1 except that additional TEA supported on polyethylene was added during the polymerization at a rate of about 1.5 millimoles of TEA/hr. In Run 1, polymerization temperature was 108°C and 9.9% hydrogen was employed to produce a polymer having a melt index ($I_2$) of 21.9 and a density of 0.9704. In Run 2, reaction temperature was 107° - 108°C and 8.4% hydrostrate of much smaller particle size than the polyethylene substrates of Examples 1 and 2 is considerably smaller than the average particle size of the polymers of Examples 1 and 2. Clearly, this comparison demonstrates that the size of the polymer particle varies with the size of the catalyst substrate.

TABLE 3

| Polymer Particle Size | | Run No. 1 | | Run No. 2 | |
|---|---|---|---|---|---|
| Mesh Size | Opening in Microns | Sieve | Wt. % Retained Cum | Sieve | Cum |
| 14 | 1400 | 0.1 | 0.1 | 0.1 | 0.1 |
| 30 | 590 | 9.6 | 9.7 | 11.9 | 12.0 |
| 40 | 420 | 20.2 | 29.9 | 22.1 | 34.1 |
| 60 | 250 | 27.6 | 57.5 | 27.1 | 61.2 |
| 80 | 175 | 18.9 | 76.4 | 18.2 | 79.4 |
| 100 | 150 | 7.4 | 83.8 | 5.6 | 85.0 |
| Pan | | 16.1 | 99.9 | 15.0 | 100.0 |
| Average Particle Size, μ | | 360 | | | |

EXAMPLE 4

Using the catalyst prepared as described in Example 3 supported on the same silica gel, several runs were made in which ethylene was copolymerized with small amounts of propylene following the same general procedure described in Example 3. Particle size distribution of the copolymer product was determined as in the previous examples. Results presented in Table 4 together with the important polymerization conditions and the melt indexes of the polymers made show that controlling the particle size of the catalyst substrate is equally effective in controlling the particle size of the polymer product in copolymerization as it is in homopolymerization.

TABLE 4

| | Run 1 | Run 2 | Run 3 |
|---|---|---|---|
| $C_3H_6$, % | 3.1–5.3 | 2–3 | 2–3 |
| $H_2$, % | 5.7–6.4 | 7.4–8.6 | 10 |
| Temp, °C | 106–109 | 102–105 | 101–104 |
| Melt Index, $I_2$ | 5.9 | 12.4 | 23.1 |
| Density, g/cc | 0.9518 | 0.956 | 0.956 |

Polymer Particle Size

TABLE 4-continued

| Mesh Size | Opening in Microns | Run 1 | | Run 2 | | Run 3 | |
|---|---|---|---|---|---|---|---|
| | | \multicolumn{6}{c|}{Wt. % Retained} |
| | | Sieve | Cum | Sieve | Cum | Sieve | Cum |
| 14 | 1400 | 0.7 | 0.7 | 0.1 | 0.1 | 0.3 | 0.3 |
| 30 | 590 | 10.3 | 11.0 | 13.7 | 13.8 | 13.9 | 14.2 |
| 40 | 420 | 19.2 | 30.2 | 21.9 | 35.7 | 19.2 | 33.4 |
| 60 | 250 | 23.1 | 53.3 | 29.3 | 65.0 | 23.9 | 57.3 |
| 80 | 175 | 19.7 | 73.0 | 11.4 | 76.4 | 12.9 | 70.2 |
| 100 | 150 | 7.0 | 80.0 | 5.2 | 81.6 | 6.6 | 76.8 |
| Pan | | 20.0 | 100.0 | 18.0 | 99.6 | 23.2 | 100.0 |
| Average Particle Size, $\mu$ | | \multicolumn{2}{c|}{340} | \multicolumn{2}{c|}{390} | \multicolumn{2}{c|}{350} |

EXAMPLE 5

A quantity of the silica gel described in Example 3 was dehydrated as described in that example. A polymerization catalyst was then prepared by charging 20 g of the dehydrated silica gel to a small fluidized-bed catalyst preparation unit and fluidizing the silica gel with oxygen-free nitrogen at about 50° C while adding dropwise 20 mmoles of TEA as a 2M solution of TEA in hexane. After evaporation of all of the hexane, 4 mmoles of $VOCl_3$ was introduced as a vapor into the unit in the nitrogen fluidizing gas to react with the TEA-silica gel reaction product. The catalyst was then diluted with 1200 cc of dry, nitrogen-purged polyethylene powder previously made in the gas phase process. Portions of the catalyst were then used to polymerize ethylene in two separate runs conducted in essentially the same manner as described in Example 3. Particle size distribution of the two polymer products was also made as described in previous examples. Results are tabulated in Table 5 below along with the conditions employed and properties of the polymers. These demonstrate that although average particle size of the polymer product is somewhat larger than that obtained in Examples 3 and 4 which is to be expected in view of the lower melt index, there is still no appreciable amount of polymer produced in the >14 mesh size range. This is undoubtedly attributable to the small particle size of the silica employed as the catalyst substrate.

TABLE 5

| | Run 1 | Run 2 |
|---|---|---|
| $H_2$, % | 18.9 | 16.4 |
| Temp. °C | 82–85 | 82–84 |
| Melt Index, ($I_2$) | 0.48 | 0.26 |
| Density, g/cc | 0.9657 | 0.9636 |

Polymer Particle Size

| Mesh Size | Opening in Microns | Wt. % Retained | | | |
|---|---|---|---|---|---|
| | | Sieve | Cum | Sieve | Cum |
| 14 | 1400 | 1.6 | 1.6 | 4.3 | 4.3 |
| 30 | 590 | 30.2 | 31.8 | 38.1 | 42.4 |
| 40 | 420 | 24.9 | 56.7 | 22.3 | 64.7 |
| 60 | 250 | 23.1 | 79.8 | 19.5 | 84.2 |
| 80 | 175 | 12.2 | 92.0 | 10.5 | 94.7 |
| 100 | 150 | 2.9 | 94.9 | 1.9 | 96.6 |
| Pan | | 4.9 | 99.8 | 3.4 | 100.0 |
| Average Particle Size, $\mu$ | | \multicolumn{2}{c|}{620} | \multicolumn{2}{c|}{800} |

EXAMPLE 6

A quantity of magnesium hydroxide (Grade M-42 available from Fisher Scientific Company) having an average particle size of about 30 to 50 $\mu$ (270 to 400 mesh size U.S. Standard Series) was dehydrated in a fluid bed at 200° C using dry nitrogen as the fluidizing gas. Approximately 43 g of the dehydrated magnesium hydroxide was charged to a small fluid-bed catalyst preparation unit and fluidized with dry oxygen-free-nitrogen at about 50° C.

To a stirred, nitrogen-blanketed glass vessel were charged 4.3 mmoles of octadecyloxyvanadium oxydichloride and hexane to bring the total volume to 100 ml. To this solution was added 8.6 mmoles of triethylaluminum as a 2M solution in hexane. The mixture was stirred for 5 minutes, then fed dropwise into the fluid-bed catalyst preparation unit onto the fluidized magnesium hydroxide to become deposited thereon. After evaporation of all of the hexane from the catalyst preparation unit, the prepared catalyst was diluted with 550 cc of polyethylene powder made in a previous gas-phase polymerization which had been purged with dry nitrogen.

The catalyst thus prepared was used to polymerize ethylene in essentially the same manner as described in Example 1 using about 11.3% hydrogen for molecular weight control and a polymerization temperature of 104° – 104.5° C. The polyethylene product had a melt index of 22.8 and a density of 0.9724 and when subjected to sieve analysis showed the following particle size distribution. Here, as with the polyethylene and silica substances, the small particle size of the magnesium hydroxide support resulted in a polymer product with only an insignificant amount of polymer particles in a size larger than 590$\mu$ (30 mesh).

Polymer Particle Size

| Mesh Size | Opening in Microns | Wt. % Retained | |
|---|---|---|---|
| | | Sieve | Cum |
| 14 | 1400 | 0.1 | 0.1 |
| 30 | 590 | 8.2 | 8.3 |
| 40 | 420 | 16.5 | 24.8 |
| 60 | 250 | 32.7 | 57.5 |
| 80 | 175 | 21.7 | 79.2 |
| 100 | 150 | 7.7 | 86.9 |
| Pan | | 13.0 | 99.9 |
| Average particle size, $\mu$ | | \multicolumn{2}{c|}{360} |

The invention is not to be considered as limited to the catalytic systems or conditions given in the examples. Any Ziegler-type catalyst may be employed, i.e., a catalyst comprising a compound of a transition metal of Groups IV – VI of the Periodic Table and an organometallic compound such as an alkyl or haloalkyl compound of a metal of Groups I to III of the Periodic Table. Preferred as transition metal compounds are those of Ti and V, especially the halides and oxyhalides of these metals such as $TiCl_4$, $TiCl_3$, $VOCl_3$, $VCl_4$ and the like with the compounds of vanadium being particularly preferred. The organometallic compound is preferably a compound of aluminum such as an alkylaluminum, for example, triethylaluminum, triisobutylaluminum, diisobutylaluminum hydride, isoprenyl aluminum and the like, alkylaluminum halides, for example, diethylaluminum chloride, diisobutylaluminum chloride, ethylaluminum dichloride and the like, and alkylaluminum alkoxides such as ethylaluminum diethoxide, diethylaluminum ethoxide, mixtures of the latter two compounds commonly called ethylaluminum sesquiethoxide and the like. Mixtures of these compounds can also be used, a particularly preferred one being that of an aluminum alkyl and an alkylaluminum alkoxide.

The foregoing catalysts can also be supported on a variety of materials. In addition to the supports or substrates shown in the examples, any inert, anhydrous materials suitable for the adsorption and/or deposition of the catalyst constituents can be used as catalyst supports provided these remain unaltered under the catalyst preparation conditions and during the polymerization process and they do not soften and/or agglomerate under such conditions. Suitable materials include, for example, hydrocarbon polymer powders other than polyethylene, calcium carbonate, calcium chloride, sodium chloride, charcoal, carbon black, alumina, thoria, zorconia, magnesium chloride, microcrystalline cellulose, non-sulfonated ion exchange resins, and the like.

The quantities of the components of the catalytic system of the invention can be varied. In general, the mole ratio of the reducing agent (non-transition metal) to transition metal compound can be in the range from 0.3:1 to 500:1, on up to 1000:1 or even higher. Preferred ratios with titanium as the transition metal, for example, lie between 1:3 and 5:1. With vanadium, the preferred transition metal, preferred Al/V ratios lie in the range from about 1:1 to 500:1. When an aluminum alkoxide is employed, the aluminum alkoxide-to-transition metal ratio may likewise vary from about 0.1:1 to about 100:1. For most effective operation, ratios from about 0.2:1 to about 50:1 are employed.

The amount of catalyst required is comparatively small. Generally, amounts from about 0.1 to 5.0% by weight based on the total weight of monomer charged are satisfactory although amounts as small as 0.001% are sometimes employed and larger amounts up to, say 20%, can be used.

The polymerization reaction can be conducted over a wide range of temperatures from 0° to 120° C and higher if desired. Preferably, reaction temperature is maintained between about 80° and 115° C. Likewise, while pressures above atmospheric, i.e., from about 50 to 1,000 psig, are preferred, subatmospheric or atmospheric pressures can be used.

The amount of hydrogen used to control the melt index and melt flow characteristics of the product produced in the fluidized reactor can be varied over a wide range depending upon the catalyst employed and the reaction temperature. Amounts from about 2–3% up to about 60% can be employed with the same catalyst under specific polymerization conditions depending upon the molecular weight (as measured by melt index) desired since the variation in this polymer property is dependent upon the relative quantity of hydrogen present. The use of hydrogen for control of molecular weight is well known and is described in detail in U.S. Pat. No. 3,051,690.

What is claimed is:

1. A process for producing homopolymers and copolymers of ethylene in the gas-phase which comprises contacting a gas stream containing ethylene under polymerization conditions with a Ziegler-type catalyst deposited on a solid support in a fluidized bed operation and controlling the particle size of the polymer product by determining the average particle size of the polymer produced and decreasing the average particle size of the catalyst support if the average particle size of the polymer product is too large and increasing the average particle size of the catalyst support if the average particle size of the polymer product is too small.

2. The process as defined in claim 1 in which the average particle size of the catalyst support is from about 30 to about 600 microns.

3. The process as defined in claim 1 wherein said gas stream is ethylene.

4. The process as defined in claim 1 wherein said gas stream is a mixture of ethylene and propylene.

5. The process as defined in claim 3 wherein said Ziegler-type catalyst consists of a compound of vanadium, an alkylaluminum compound other than an alkylaluminum alkoxide and an alkylaluminum alkoxide.

6. The process as defined in claim 5 wherein said solid support is polyethylene.

7. The process as defined in claim 5 wherein said solid support is silica gel.

8. The process as defined in claim 6 wherein said vanadium compound is vanadium oxytrichloride, said alkylaluminum compound is isoprenyl aluminum and said alkylaluminum alkoxide is ethylaluminum sesquiethoxide.

9. The process as defined in claim 7 wherein said vanadium compound is vanadium oxytrichloride, said alkylaluminum compound is triethylaluminum and said alkylaluminum alkoxide is ethylaluminum diethoxide.

10. The process as defined in claim 3 wherein said Ziegler-type catalyst consists of a compound of vanadium and an alkylaluminum compound.

11. The process as defined in claim 10 wherein said solid support is magnesium hydroxide, said vanadium compound is octadecyloxyvanadium oxydichloride and said alkylaluminum compound is triethylaluminum.

* * * * *

UNITED STATES PATENT OFFICE
CERTIFICATE OF CORRECTION

Patent No. 3,925,338     Dated December 9, 1975

Inventor(s) Morris R. Ort

It is certified that error appears in the above-identified patent and that said Letters Patent are hereby corrected as shown below:

Column 6, TABLE 3, insert the number 390 for Average Particle Size, μ, between last two columns headed Run No. 2

Column 8, line 37, For "substances" read "substrates"

Signed and Sealed this twenty-ninth Day of June 1976

[SEAL]

Attest:

RUTH C. MASON
Attesting Officer

C. MARSHALL DANN
Commissioner of Patents and Trademarks